United States Patent [19]

Kandlur et al.

[11] Patent Number: 5,742,347
[45] Date of Patent: Apr. 21, 1998

[54] EFFICIENT SUPPORT FOR INTERACTIVE PLAYOUT OF VIDEOS

[75] Inventors: Dilip Dinkar Kandlur, Briarcliff Manor; Ming-Syan Chen, Yorktown Heights, both of N.Y.

[73] Assignee: International Business Machines Corporation, Armonk, N.Y.

[21] Appl. No.: 590,966

[22] Filed: Jan. 24, 1996

Related U.S. Application Data

[63] Continuation of Ser. No. 308,763, Sep. 19, 1994.

[51] Int. Cl.$^6$ ............................... H04N 7/32; H04N 7/34; H04N 7/36; H04N 7/50

[52] U.S. Cl. ............... 348/426; 348/7; 348/13; 348/409; 348/412; 348/441; 358/312

[58] Field of Search ...................... 348/426, 469, 348/390, 384, 415–417, 409, 412, 394, 404, 407, 413, 414, 487, 608, 613, 400, 402, 441, 13, 7, 12; 358/335, 312, 311, 310; 360/14.1, 10.1, 9.1, 33.1; H04N 7/261, 7/32, 7/34, 7/36, 7/48, 7/50

[56] References Cited

U.S. PATENT DOCUMENTS

| | | | |
|---|---|---|---|
| 5,122,875 | 6/1992 | Raychaudhuri et al. | 348/390 |
| 5,146,325 | 9/1992 | Ng | 348/384 |
| 5,164,839 | 11/1992 | Lang | 348/335 |
| 5,231,384 | 7/1993 | Kuriacose | 348/409 |
| 5,247,347 | 9/1993 | Litteral et al. | 348/7 |
| 5,262,875 | 11/1993 | Mincer et al. | 358/335 |
| 5,267,334 | 11/1993 | Normiller et al. | 348/409 |
| 5,287,178 | 2/1994 | Acampora et al. | 348/469 |
| 5,305,113 | 4/1994 | Iwamura et al. | 358/335 |
| 5,371,532 | 12/1994 | Gelman et al. | 348/13 |
| 5,414,455 | 5/1995 | Hooper et al. | 348/7 |

FOREIGN PATENT DOCUMENTS

| | | |
|---|---|---|
| A0637888 | 3/1994 | European Pat. Off. |
| A4334931 | 10/1993 | Germany |
| A0613298 | 12/1993 | Germany |

OTHER PUBLICATIONS

ISO/IEC Recomendation CD 111 72–2, 1993 (E), Table of Contents, pp. i–ix, 15–18, 52–53, 67–72 and 77–80.

M.S. Chen et al., "Downloading and Stream Conversion: Supporting Interactive Playout . . . " Int'l Conf. on Multimedia Computing Systems, 15–18, May 1995, Washington, DC pp. 73–80.

A. Puri et al. "Video Coding with Motion Compensated Intepolatin for CD-ROM Applications" Signal Processing Image Communication vol. 2, No. 2, Aug. 1990, p. 130.

Primary Examiner—Glenton B. Burgess
Attorney, Agent, or Firm—Richard M. Ludwin

[57] ABSTRACT

A system and method of transforming the standard compressed media stream used for distribution to a local form for a client station. A media stream is downloaded from an input source to a device in the local station and then played out the video stream in the local station. During the playout, the stream is transformed to another storage format by altering the standard/original compression form to a local form.

18 Claims, 4 Drawing Sheets

```
TEMPORAL ORDER:    I  B  B  I  B  B  I  B  B  I  B  B  I  B  B  I ...
FRAME NUMBER:     15 14 13 12 11 10  9  8  7  6  5  4  3  2  1  0

PRESENTATIONAL ORDER: I  I  B  B  I  B  B  I  B  B  I  B  B  I  B  B ...
FRAME NUMBER:        15 12 14 13  9 11 10  6  8  7  3  5  4  0  2  1
```

FIG. 1
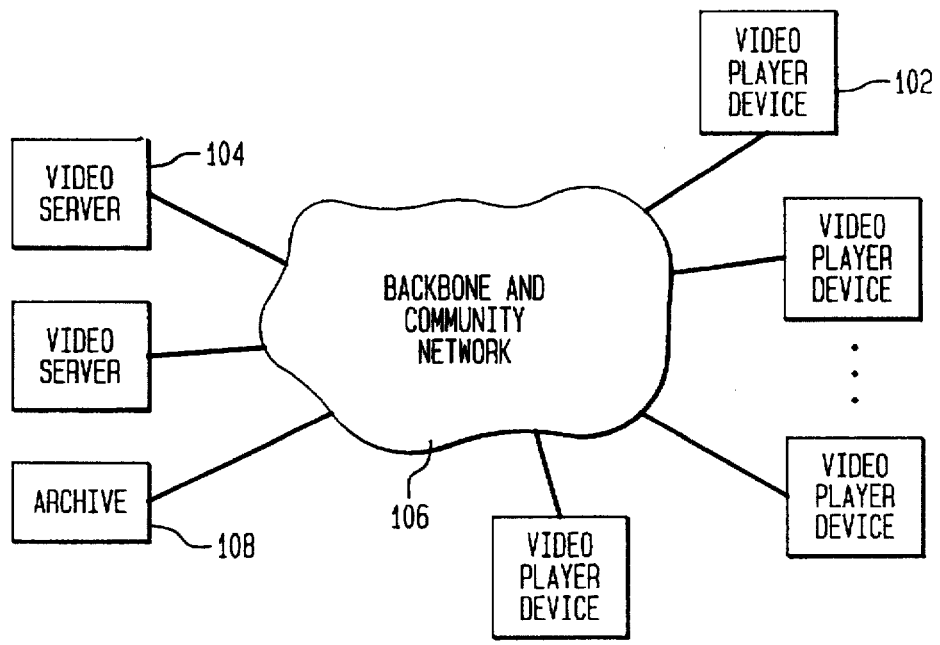
FIG. 2
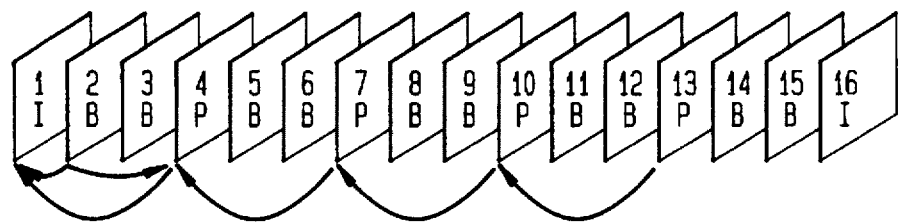
FIG. 3
| TEMPORAL ORDER: | I | B | B | P | B | B | P | B | B | P | B | B | P | B | B | I | ... |
|---|---|---|---|---|---|---|---|---|---|---|---|---|---|---|---|---|---|
| FRAME NUMBER: | 1 | 2 | 3 | 4 | 5 | 6 | 7 | 8 | 9 | 10 | 11 | 12 | 13 | 14 | 15 | 16 | |
| PRESEN./STORAGE ORD.: | I | P | B | B | P | B | B | P | B | B | P | B | B | I | B | B | ... |
|---|---|---|---|---|---|---|---|---|---|---|---|---|---|---|---|---|---|
| FRAME NUMBER: | 1 | 4 | 2 | 3 | 7 | 5 | 6 | 10 | 8 | 9 | 13 | 11 | 12 | 16 | 14 | 15 | |

```
ORIGINAL FRAMES STORED: I  P  B  B  P  B  B  P  B  B  P  B  B  I  B  B ...
FRAME NUMBER:           1  4  2  3  7  5  6  10 8  9  13 11 12 16 14 15

FRAMES STORED
AFTER P/I CONV:         I  I  B  B  I  B  B  I  B  B  P  B  B  I  B  B ...
FRAME NUMBER:           1  4  2  3  7  5  6  10 8  9  13 11 12 16 14 15
```

| TEMPORAL ORDER: | I | B | B | I | B | B | I | B | B | I | B | B | I | B | B | I | ... |
|---|---|---|---|---|---|---|---|---|---|---|---|---|---|---|---|---|---|
| FRAME NUMBER: | 15 | 14 | 13 | 12 | 11 | 10 | 9 | 8 | 7 | 6 | 5 | 4 | 3 | 2 | 1 | 0 | |

| PRESENTATIONAL ORDER: | I | I | B | B | I | B | B | I | B | B | I | B | B | I | B | B | ... |
|---|---|---|---|---|---|---|---|---|---|---|---|---|---|---|---|---|---|
| FRAME NUMBER: | 15 | 12 | 14 | 13 | 9 | 11 | 10 | 6 | 8 | 7 | 3 | 5 | 4 | 0 | 2 | 1 | |

EFFICIENT SUPPORT FOR INTERACTIVE PLAYOUT OF VIDEOS

This is a continuation of application Ser. No. 08/308,763, filed Sep. 19, 1994.

BACKGROUND OF THE INVENTION

1. Field of the Invention

The present invention relates to the support of interactive playout operations on a compressed video stream at a player device.

2. Related Art

Compression techniques play a key role in processing digital multimedia data, particularly for video data. There are three major reasons for the necessity of doing video data compression: (1) the prohibitively large storage required for uncompressed multimedia data, (2) relatively slow storage devices that are unable to retrieve video data for real-time playout unless the data is compressed, and (3) network bandwidth that does not allow real time video transmission for uncompressed data.

For example, a single color video frame with 620 by 560 pixels and 24 bits per pixel will require one Mbyte of storage. At a real-time rate 20 frames per second, a 30-minute video would require more than 35 Gbytes of storage. As a result of the extremely large volume of video data, the above three factors have suggested that the only solution to processing video data is to compress the video data before storage and transmission, and decompress it before its playback. Inter-frame compression techniques provided by MPEG render significant advantages in storage and transmission, and consequently MPEG has become the prevalent standard to handle video streams. In order to facilitate storage and retrieval, the MPEG standard defines a compressed stream whose rate is bounded.

Interactive TV and movie-on-demand have been identified as two important services made possible by advances in video compression and network transmission technologies. A video server for this purpose is expected not only to concurrently serve many clients (hundreds or more), but also to provide many interactive features for video playout, such as pause/resume, backward play, and fast-forward (FF) and fast-backward (FB) play, which home viewers have been enjoying from the current VCR systems. However, recent studies indicate that to meet these requirements, the server would need a tremendous amount of computing power, storage, and communication bandwidth. Also, such factors as implementing pause/resume functions, skewed movie requests and peak-hour activities have made it very difficult, if not impossible, to have a cost-effective resource allocation (in terms of CPU, storage and network bandwidth). Furthermore, the inter-frame dependency of MPEG makes it very costly to provide backward play, FF and FB features over the network. Consequently, the feasibility of providing interactive movie viewing over the network (including backbone and cable networks) needs further cost-justification.

To avoid the above drawbacks, the present invention considers an alternative solution for the movie-on-demand service. This solution involves downloading of the video data into the storage of the player device located at the customer premise, which the customer can operate subsequently without further intervention from the network. With the current disk bandwidth (e.g., a SCSI disk), downloading a 100 minute MPEG movie from the remote video server over the network to the disk of the client station is expected to take approximately 3 to 5 minutes, close to the time for TV commercial breaks that is generally acceptable for the end viewers.

With video data stored in the player's storage, viewers can enjoy all the interactive features for video viewing without incurring any server resources and network bandwidth. In addition, since downloading can be done prior to viewing, the effects of skewed movie requests and peak-hour activities can be minimized.

While providing a player device at the customer premises is desirable, one still encounters a deficiency for interactively playing MPEG movies, which arises in backward playout (and also in fast-backward playout).

The structure of MPEG stream imposes several constraints on the video data storage and playout. An MPEG video stream consists of intra frames (I), predictive frames (P), and interpolated frames (B). In this stream, I frames are coded such that they are independent of any other frames in the sequence; P frames are coded using motion estimation and have a dependency on the preceding I or P frame. On the other hand, B frames depend on two "anchor" frames: the preceding I/P frame and the following I/P frame. Since the P and B frames use inter-frame compression, they are substantially smaller than I frames.

In order to simplify buffering at the decoder, the MPEG standard requires that the decoder be presented with frames in an ordering that is appropriate for decoding. Specifically, a frame is presented to the decoder only after all frames on which it is dependent have been presented. It can be seen that this presentation order is different from the temporal order for B frames since these frames have a dependency on the following anchor (I or P) frame. The presentation order of the frames, which differs from the temporal order, reflects the order in which the frames have to be delivered to the decoder. The inter-frame dependency implies that it is not possible to decode a P frame without the preceding I or P frame. Similarly, it is not possible to decode a B frame without the corresponding two anchor frames (i.e., two P frames, or one I and one P frames).

While this presentation order reduces the buffer space required for forward playout, it does not address the problem of backward playout. Since frames are encoded using forward prediction, in order to display a particular frame it is necessary to decompress a large number of preceding frames on which this frame may be dependent. These decompressed frames are large and they increase the memory requirement of the decoder substantially. Moreover, the number of such buffers required increases linearly with the length of the chain of predicted frames. Since the video player, as with most consumer products, is a price-sensitive component, such a requirement for large number of memory buffers is highly undesirable for product competitiveness.

SUMMARY OF THE INVENTION

In light of the above, the present invention provides support for interactive playout operations on a compressed video stream at a player device wherein the standard compressed stream received by the player is transformed into a local form. This local form is optimized to support interactive playout features such as backward play, fast-backward play, etc.

Advantageously, this invention provides an efficient method to support the interactive playout for MPEG videos and minimize the memory buffer requirement in the player device. Further, conversion to a local form at the set-top box allows for compatibility with the standards for video data distribution, while giving the set-top box the flexibility to locally enhance the stream for special effects.

The standard stream is typically highly compressed, so as to minimize the cost of distribution—such as storage, network transmission, whereas the local stream is optimized for effective playback.

In a preferred embodiment, the standard stream is an MPEG stream provided from a server over a communications network. In this embodiment, the set-top box encodes the incoming P frames as I frames after the decompression and playout of each P frame, thus transforming the standard compressed MPEG stream into a local stream. Specifically, after a P frame is retrieved, decompressed and played out, it is encoded as an I frame and stored back into a secondary storage device within the set-top box. Since this P-I conversion is performed after a P frame is decompressed and played out, there is no extra cost required for decoding. Moreover, since there is no motion estimation and compensation required for compressing a single frame into an I frame, this I frame encoding can be done very efficiently.

These, and other features and advantages of this invention will become apparent from the following detailed description of the invention taken in conjunction with the accompanying drawings.

BRIEF DESCRIPTION OF THE DRAWINGS

FIG. 1 is an illustration of the environment for the movie-on-demand system using a player device in the customer premises;

FIG. 2 shows the inter-frame dependencies in a sequence of MPEG frames;

FIG. 3 illustrates the differences between the temporal order and the presentation order for a sequence of MPEG frames;

DETAILED DESCRIPTION OF A PREFERRED EMBODIMENT

Figures 4, 5:
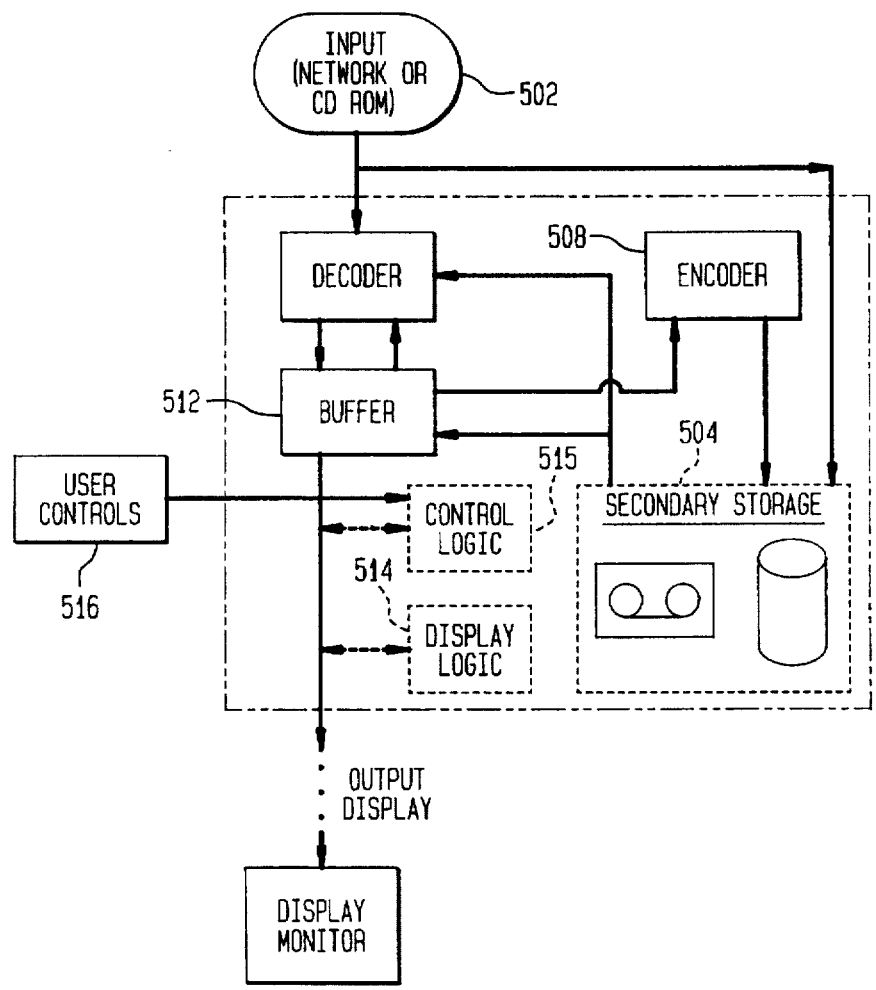
FIG. 4 shows a sequence of MPEG frames before and after the frame conversion process.
FIG. 5 shows a player device with the capability of transforming a standard compressed stream into its local form.

FIG. 1 illustrates an environment for a movie-on-demand system that uses a video player 102 at the customer premises. In this environment, video data is stored on the video server 104 and transmitted to the video player 102 by way of a wide area network 106 upon request. The transmission occurs at high speed so as to permit downloading of the entire movie within a few minutes of elapsed time. The movie on demand system may also include an archive 108 (e.g. a video tape library) coupled to the network, thus giving the video servers 104 access to a larger number of movies than those which they can hold in their local storage.

A block diagram of a client station video player according to an embodiment of the present invention is shown in FIG. 5. The video player contains an input device 502, a secondary (temporary) storage device 504, a video/audio encoder 508, a video/audio decoder 510, a buffer memory 512, and display driver (display logic) 514. The video player also includes control logic 515 which can be embodied as a conventional microprocessor programmed to perform the functions which will be described later with respect to FIGS. 6 and 7. In addition to the above, the client station also includes user controls 516 (which may be in the form of push buttons on the device itself or a on a remote controller) which control the playout of videos. This controls include features of conventional VCRs such as stop, pause, play, fast forward ad fast backward.

The input device 502 can be embodied as a network interface, a CD-ROM reader, or some such device, and it is used for reading in an MPEG standard video stream. In practice, the video player will typically include an input buffer (not shown) which receives and temporarily stores the MPEG stream arriving from the input device. The secondary storage device 504, which is a read/write device such as a conventional magnetic hard disk drive or a read/write optical disk drive, is used to store the transformed video stream. The buffer memory 512 can be embodied as a conventional random access semiconductor memory.

The encoder 508 can be embodied as a JPEG encoder or as an MPEG "I frame only" encoder. The decoder 512 can be embodied as a conventional MPEG decoder. The display driver 514 can be a conventional television display controller of a type which reads data from the buffer memory 512 and converts the data to RF signals for display by a conventional television monitor. Alternatively, the display driver can be an SVGA controller which processes the data in the buffer memory for presentation on a conventional SVGA computer monitor.

FIG. 2 shows the inter-frame dependencies in a sequence of MPEG frames 1–16, where the frames are numbered in temporal order. The MPEG stream consists of intra (I) frames, predictive (P) frames, and interpolated (B) frames. The arrows illustrate the dependencies between frames. Since forward prediction is used for P frames, they depend on preceding frames in the temporal order. For example, frame 13 (P) is dependent on frame 10 (P), which in turn is dependent on frame 7 (P), and so on.

For an MPEG frame sequence, FIG. 3 shows the differences between the order in which compressed frames are presented to the decoder 510 (presentation order) and the order in which decompressed frames are presented to the viewer (temporal order) on the display 514. The MPEG standard specifies that a frame is presented to the decoder only after all the frames on which it is dependent have been presented. For example, frame 2 (B) is presented to the decoder 510 only after frames 1 (I) and 4 (P) have been presented. It can be seen that for normal forward playout, it is necessary to keep exactly two decompressed frames in the buffer memory 512 for decoding frames that reference these two frames.

For the example in FIG. 3, decompressed frames 1 (I frame) and 4 (P frame) are required to decode frame 2 (B frame). On the other hand, when decoding frame 5 (B frame), we need decompressed frames 4 and 7 (two P frames), and do not need frame 1 anymore. Since decompressed frames are of the same size, we need buffer space for two decompressed frames to do the decoding for normal playout.

While this presentation sequence obviates the need for storing compressed frames during forward playout, it does not address the problems of backward playout. Consider the case that a viewer decides to play backward when he is viewing frame 14 (at that moment we have decompressed frames 13 and 16 in the buffer). He can then view frame 13. However, to decode frame 12, the decoder needs "decompressed" frames 10 and 13.

To obtain decompressed frame 10, the decoder 510 needs decompressed frame 7, which in turn requires decompressed frame 4 and frame 1. Thus, to decode a frame P during the backward playout using the MPEG stream, it is required to decode, in a reverse sequence, all the P frames until an I frame is reached. Note that this reverse chained-decoding is required for backward playout from an MPEG stream, but not for forward playout, since a P frame is encoded based on the "previous" I/P frame. The buffer space required for backward playout thus increases significantly (We need the buffer space for 5 decompressed frames in this case). Also, such a burst of reverse chained-decoding is very undesirable since the memory bandwidth is identified as the primary limitation on the performance of a decoder.

In order to facilitate backward playout, the present invention performs a transformation of the standard MPEG encoded stream into a local compressed form. Specifically, after a P frame is retrieved, decompressed and played out, it is encoded an I frame by the encoder 508 and stored it back to the secondary storage 504. Since this P-I conversion is performed after a P frame is decompressed and played out, there is no extra cost required for decoding. More importantly, since there is no motion estimation and compensation required for compressing a single frame into an I frame, this I frame encoding can be done very efficiently.

FIG. 4 shows a snapshot for the compressed frames stored in the secondary storage when the normal playout reaches frame 14 (when decompressed frames 13 and 16 are kept in the buffer). It can be seen that using the P-I conversion, the buffer space required for backward play is the amount for storing two decompressed frames, i.e., the same as required for forward play.

For example, consider again the case that a viewer decides to play backward when he is viewing frame 14 (with decompressed frames 3 and 16 in the buffer). He next views frame 13, and is then able to view frame 12 which is decoded based on frames 10 and 13. Note that with P-I conversion, frame 10 is now stored as an I frame in the secondary storage, and can be retrieved and decompressed by itself to be used for decoding frame 12. The reverse chained-decoding required for the backward playout in the original MPEG stream is thus avoided.

Figure 6:
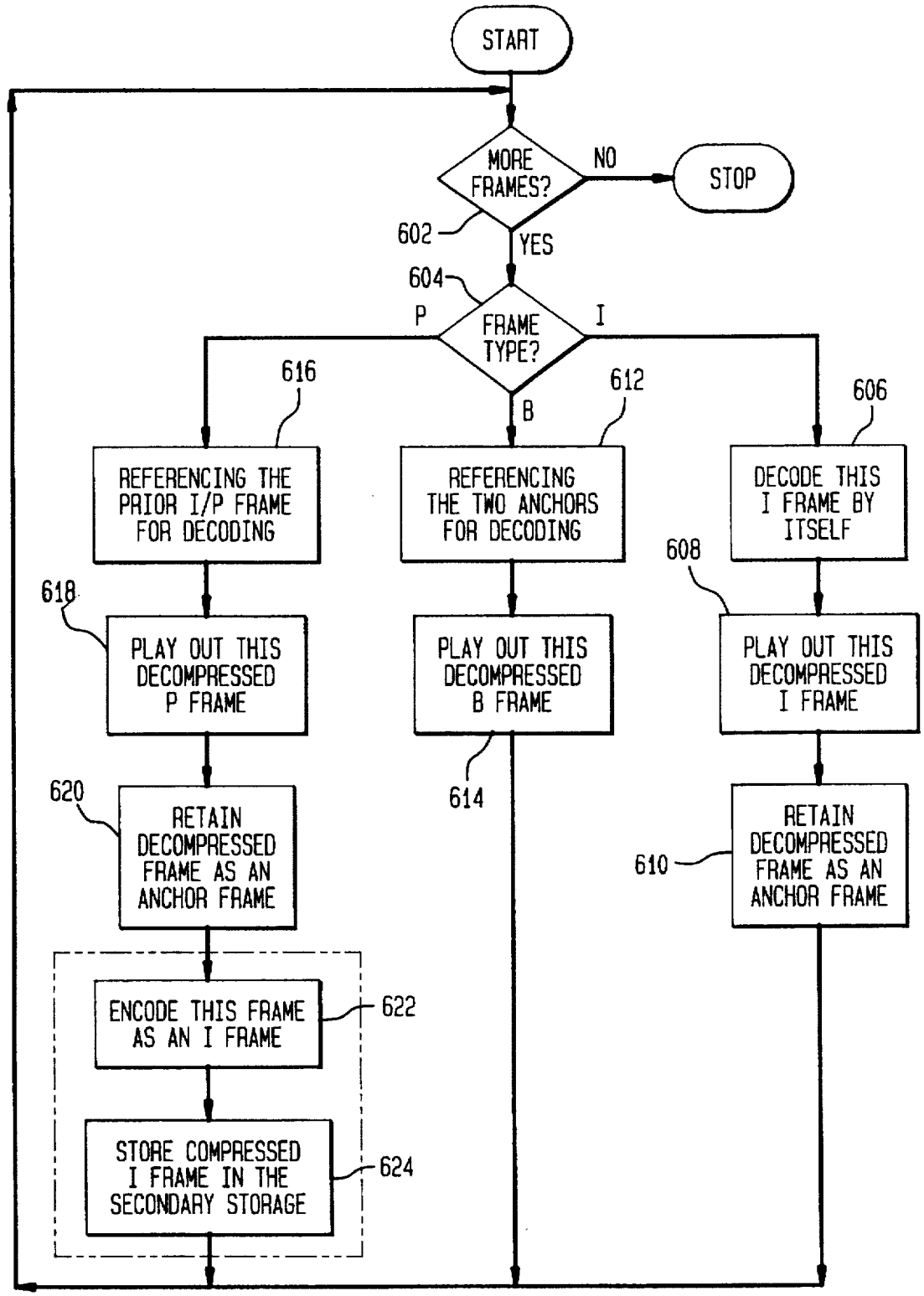
FIG. 6 is a detailed flow diagram for the decoder in the player device during forward playout.

The execution flow for decoding during the normal playout is shown in FIG. 6, where the player of FIG. 5 reads consecutive video frames, decodes them, and displays them. The decoder operations are determined by the frame type, and they rely on two decompressed "anchor" frames. In FIG. 6, the dotted line indicates the operations added to a conventional player in order to convert P frames to I frames.

In step 602 the control logic determines if there are any more incoming MPEG frames to be processed. If not, the control logic terminates the decoding operation. If more frames are to be processed, in step 604 the control logic determines the frame type. It should be noted that the MPEG stream includes markers which identify the frame type.

If the frame is an I frame, it is decoded (decompressed) in step 606 and played out (on the monitor) in step 608 without depending on any other frame. In step 610, the decompressed I frame is also retained in the buffer memory 512 as an anchor frame.

If, in step 605, the frame is identified as a B frame, in step 612 the frame is decoded by conventionally referencing the preceding two anchor frames (stored in the memory buffer in step 610). Then, in step 614 the decompressed frame is played out.

If, in step 604, the frame is identified as a P frame, in step 616 the frame is decompressed by conventionally referencing the preceding anchor frame (stored in the memory buffer in step 610) and then played out in step 618. In step 620 the decompressed P frame is also retained in the memory buffer as an anchor frame. In addition, in step 622 the decompressed P frame is encoded as an I frame and stored in the secondary storage in step 624.

Since this P-I conversion is performed after a P frame is decompressed and played out, it does not impose any additional cost/delay on the decoder. Also, since the P frame to I frame transformation process does not require any compute intensive motion search/estimation, it can be performed easily in real-time. Note that the I frame resulting from the transformation replaces the original P frame on the storage media, since this P frame is now redundant.

Figures 7, 8:
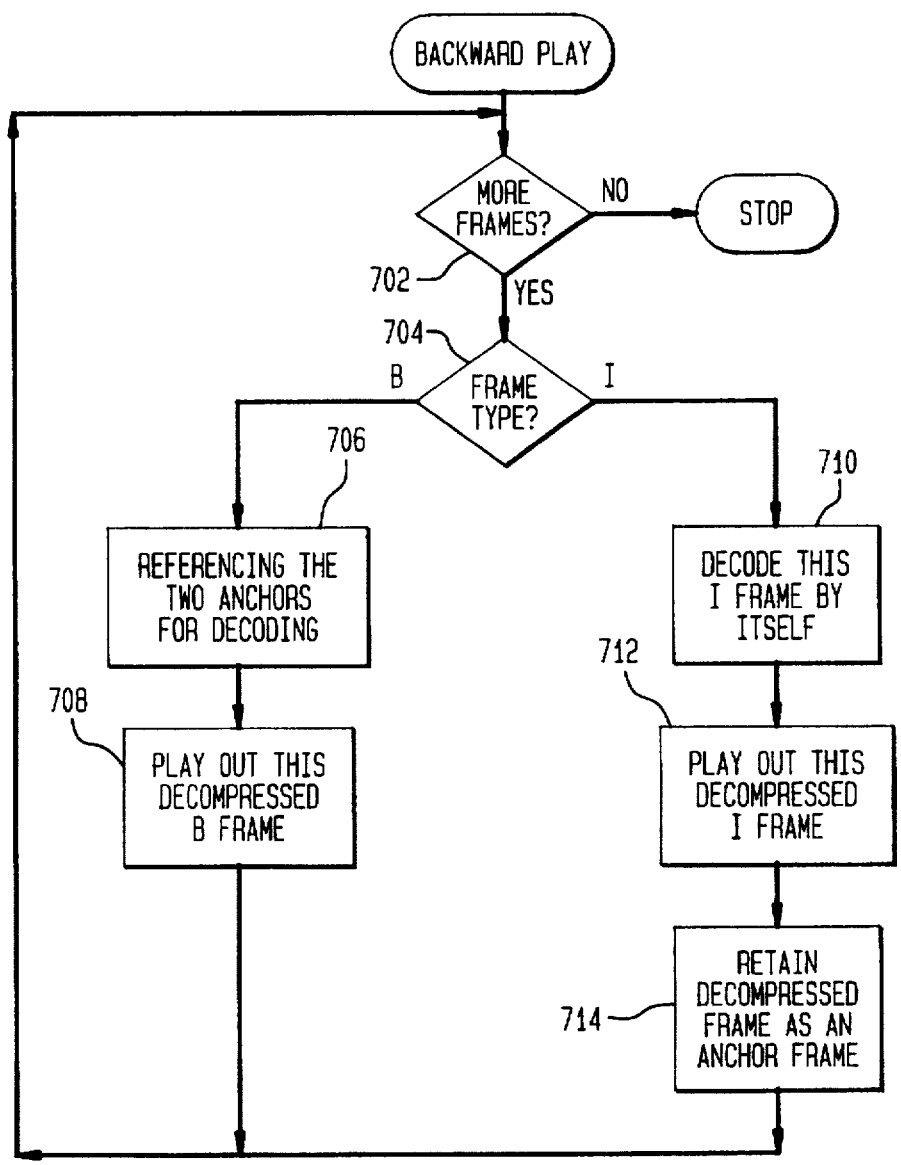
FIG. 7 is a detailed flow diagram for the decoder in the player device during backward playout; and, FIG. 8 shows the temporal and presentation orders of MPEG frames for backward playout.

The execution flow for decoding during the backward playout is shown in FIG. 7. In step 702 the control logic determines if there are any more incoming MPEG frames to be processed. If not, the control logic terminates the decoding operation. If there are more frames to be decoded, in step 704 the control logic determines the frame type. If the frame is a B frame it is decoded by reference to the preceding two anchor frames in step 706 and then played out in step 708. It the frame is an I frame, it is decoded in step 710, played out in step 712 and retained in the secondary storage as an anchor frame in step 714. The decoding of the I frames and B frames is done in a conventional manner.

The order of frame retrieval for the backwards playout is the inverse of the order for forward playout. As in forward playout, frames are presented to the decoder in an order that is different from the temporal order. For example, in FIG. 8, frame 12 is decoded before frame 14 since frame 12 is an anchor frame that is required for the decoding of frame 14. However, frame 14 is presented (displayed) before frame 12. Since P frames are replaced by I frames during forward play, the only types of frames encountered during backward play are I and B frames.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of transforming a compressed media stream used for distribution of video information to a local client station, comprising the steps of:

downloading the compressed media stream from an input source to a device in the local station, the compressed media stream having a compression format of a type that requires a temporally previous frame to fully decode a temporally subsequent frame;

playing out a video stream, decoded from the compressed media stream, from the local station;

transforming the compressed media stream to data having another storage format during the playing out by altering the compression format of the temporally subsequent frame to a temporally independent anchor frame format suitable for use in decoding interframe encoded frames during subsequent playing out of the video stream.

2. The method of claim 1 wherein the storage format includes compressed video data.

3. The method of claim 1 comprising the further step of, storing the data in a memory buffer.

4. The method of claim 3 comprising the further step of playing out at least some of the data from the memory buffer in reverse temporal order.

5. The method of claim 3 wherein the playing out in reverse temporal order comprises skipping a number of frames between playout.

6. The method of claim 1 wherein the compressed media stream is of an MPEG format and wherein the storage format includes converting decompressed P frames to I frames.

7. The method of claim 1 wherein the compressed stream is an MPEG stream and wherein the transformation is a procedure comprising the steps of:

encoding P frames in the MPEG stream as I frames after the decompression and playout of each P frame;

storing the compressed I frames in a secondary storage for later use.

8. The method of claim 7 wherein the encoding a P frame into an I frame is performed by a component in the local station.

9. A method of transforming a compressed media stream of a type wherein video data is encoded as a plurality of frames and wherein interframe dependencies exist in the compression media stream such that the decompression of at least some frames is dependent upon decompression of at least once predecessor frame, comprising the steps of:

downloading the compressed media stream from a source to a video playout station;

decompressing the compressed media stream at the playout station and providing video signals generated from the compressed media stream to a playout device;

during the providing, transforming the compressed media stream to video data having another storage format; the storage format being of a type wherein at the least some of the frames are converted to temporally independent anchor frames suitable for use in decoding interframe encoded frames during subsequent provision of the video signals to the playout device.

10. The method of claim 9 wherein the compressed media stream is of an MPEG format and wherein the transforming comprises the steps of transforming P frames in the stream into I frames.

11. The method of claim 10 comprising the further step of playing out at least some of the frames of the another storage format, stored in the storage media, in reverse temporal order.

12. An apparatus for playing out videos provided in a temporally dependant, compressed form, comprising:

an interface for receiving compressed video data;

a decoder, coupled to the interface, for decompressing the compressed video data;

a buffer memory for storing the decompressed video data;

a display controller, coupled to the buffer memory, for reading the data from the buffer memory and converting the data to a displayable form;

an encoder coupled to the buffer memory, for converting at least some of the compressed video data into temporally independent anchor frames suitable for use decoding interframe encoded frames during subsequent provision of the video signals to the playout device; and, a secondary storage device connected to receive the temporally independent anchor frames from the encoder.

13. The apparatus of claim 12 wherein the decoder is an MPEG decoder and wherein the encoder converts P frames received by the decoder into I frames.

14. The apparatus of claim 12 further comprising means for playing out at least some of the data from the buffer memory in reverse temporal order.

15. The apparatus of claim 14 wherein the playing out in reverse temporal order comprises skipping a number of frames between playout.

16. The apparatus of claim 12 wherein the compressed video data is an MPEG stream, the encoder comprises means for encoding P frames in the MPEG stream as I frames after the decompression and playout of each P frame; and wherein the compressed I frames are stored in the secondary storage device for later use.

17. The apparatus of claim 12 further comprising user controls and means for playing out the frames of the local storage format from the secondary storage in reverse temporal order, in response to a command signal from the user controls.

18. The apparatus of claim 12 wherein the local storage format comprises compressed video frames.

* * * * *